(12) United States Patent
Dharmadhikari et al.

(10) Patent No.: US 9,703,747 B2
(45) Date of Patent: Jul. 11, 2017

(54) REMOTE CONSOLE ACCESS OF PORT EXTENDERS USING PROTOCOL EXTENSION

(71) Applicant: DELL PRODUCTS L.P., Round Rock, TX (US)

(72) Inventors: Vivek Dharmadhikari, San Jose, CA (US); Vinay Sawal, Fremont, CA (US); Shree Murthy, San Jose, CA (US); Timothy Thinh Mai, San Jose, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 480 days.

(21) Appl. No.: 14/283,751

(22) Filed: May 21, 2014

(65) Prior Publication Data

US 2015/0339249 A1    Nov. 26, 2015

(51) Int. Cl.
*G06F 13/24* (2006.01)
*G06F 13/42* (2006.01)
*H04L 12/24* (2006.01)

(52) U.S. Cl.
CPC .......... *G06F 13/4221* (2013.01); *G06F 13/24* (2013.01); *H04L 41/0836* (2013.01)

(58) Field of Classification Search
USPC .................. 710/104–110, 306–317, 260–269
See application file for complete search history.

(56) References Cited

U.S. PATENT DOCUMENTS

| 7,881,221 B2* | 2/2011 | Arad | H04L 1/24 370/252 |
| 8,027,473 B2* | 9/2011 | Stiscia | H04L 63/0428 370/397 |
| 8,644,194 B2* | 2/2014 | Kamath | H04L 49/70 370/255 |
| 8,830,841 B1* | 9/2014 | Mizrahi | H04L 41/00 370/230.1 |
| 2004/0136712 A1* | 7/2004 | Stiscia | H04J 3/1694 398/60 |
| 2012/0093034 A1* | 4/2012 | Kamath | H04L 49/70 370/255 |
| 2014/0071831 A1* | 3/2014 | Sinha | H04L 41/0213 370/241.1 |
| 2014/0112657 A1* | 4/2014 | Diab | H04L 41/5025 398/25 |

OTHER PUBLICATIONS

Super SMT IPMI User's Guide Revision 2.3a, May 22, 2015 (135pgs).

\* cited by examiner

*Primary Examiner* — Raymond Phan
(74) *Attorney, Agent, or Firm* — North Weber & Baugh LLP

(57) ABSTRACT

Embodiments of the present invention facilitate access to an information handling system, such as a port extender, from a remote information handling device, such as a controlling bridge. According to embodiments of the invention, a port extender, responsive to receiving a request from a controlling bridge for console access to the port extender, submits one or more instructions to a MUX to switch control of a UART from a host CPU of the port extender to a protocol extension message processor residing on the port extender, and switches control by the MUX of the UART to the processor according to the one or more instructions.

20 Claims, 6 Drawing Sheets

Service Class Table 400

| Bits | Name | Description |
|---|---|---|
| 7:5 | Reserved | Reserved bits are set to zero when sending an OAMPDU and will be ignored on reception for compatibility with future use of reserved bits. |
| 4 | Ack | Acknowledge bit. When this bit is set, the OAM PDU represents an acknowledge frame from PE back to CB for the requested service class. |
| 3:0 | Service Class | The service class defines the type of management service to be controlled. Following types are currently being envisioned:<br>• 0000 = Reserved<br>• 0001 = Device Control<br>• 0010 = Console access/redirect<br>• 0100 – 1111 = Reserved |

FIGURE 4

Service Command Table 500

| Bits | Name | Description |
|---|---|---|
| 7:4 | Reserved | Reserved bits are set to zero when sending an OAMPDU and will be ignored on reception for compatibility with future use of reserved bits. |
| 3:0 | Service Command for "Console Access/ Redirect" | Service Class commands for Service Class "Console Access". Following commands are currently being envisioned:<br>• 0000 = Reserved<br>• 0001 = Initiate Console access<br>• 0010 – 1111 = Reserved |

FIGURE 5

REMOTE CONSOLE ACCESS OF PORT EXTENDERS USING PROTOCOL EXTENSION

BACKGROUND

Field of Invention

The present invention relates generally to data communication networks, and relates more particularly to remote access and debugging of port extenders in communication networks.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In enterprise computing, a large number of physical and virtual computing devices/information handling devices are often located in a geographically dispersed environment. To perform administrative tasks on these computing devices, remote connectivity is necessary. Traditionally, administrators and developers have used terminal servers for remote console access. Terminal servers may make remote console access available to users through one or more serial ports, such as Universal Asynchronous Receive Transmit (UART) ports. Through a serial point on a terminal server, a user can be connected to other computing devices, including network elements on the network. In the current enterprise computing environment, the traditional remote console access approach is not cost effective for managing a growing number of network elements.

For example, in a network using extended bridge technology, one controlling bridge may support up to 8K ports. This means, using 48-port port extenders as subordinating entities to the controlling bridge, the controlling bridge may need to manage about 155 port extender devices, which could be located in geographically dispersed places. One terminal server may cost in the range of a few hundred dollars. Given the vast number of port extenders that needs to be managed by a controlling bridge, there is huge capital expense. Further, each terminal server may require management in the form of a connection tuple, such as (IP address, serial port number). Again, given the vast number of port extenders that need to be managed by a controlling bridge, there is a huge operational expense associated with the use of external terminal servers for remote console access. In addition, some network technologies, such as the extended bridge technology, are capable of providing remote connectivity with a central point of control. Using out-of-band terminal servers, which require additional hardware and configuration, for remote console access goes against the concept of a centralized control.

Accordingly, there is need for a low-cost and highly responsive system and method to provide in-band console access and debugging mechanism of geographically dispersed network elements from a central location.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

FIG. 4 depicts an exemplary service class table according to embodiments of the present invention.

FIG. 5 depicts an exemplary service command table for a service class type console access/redirect according to embodiments of the present invention.

DESCRIPTION OF THE PREFERRED EMBODIMENTS

Figure 1:
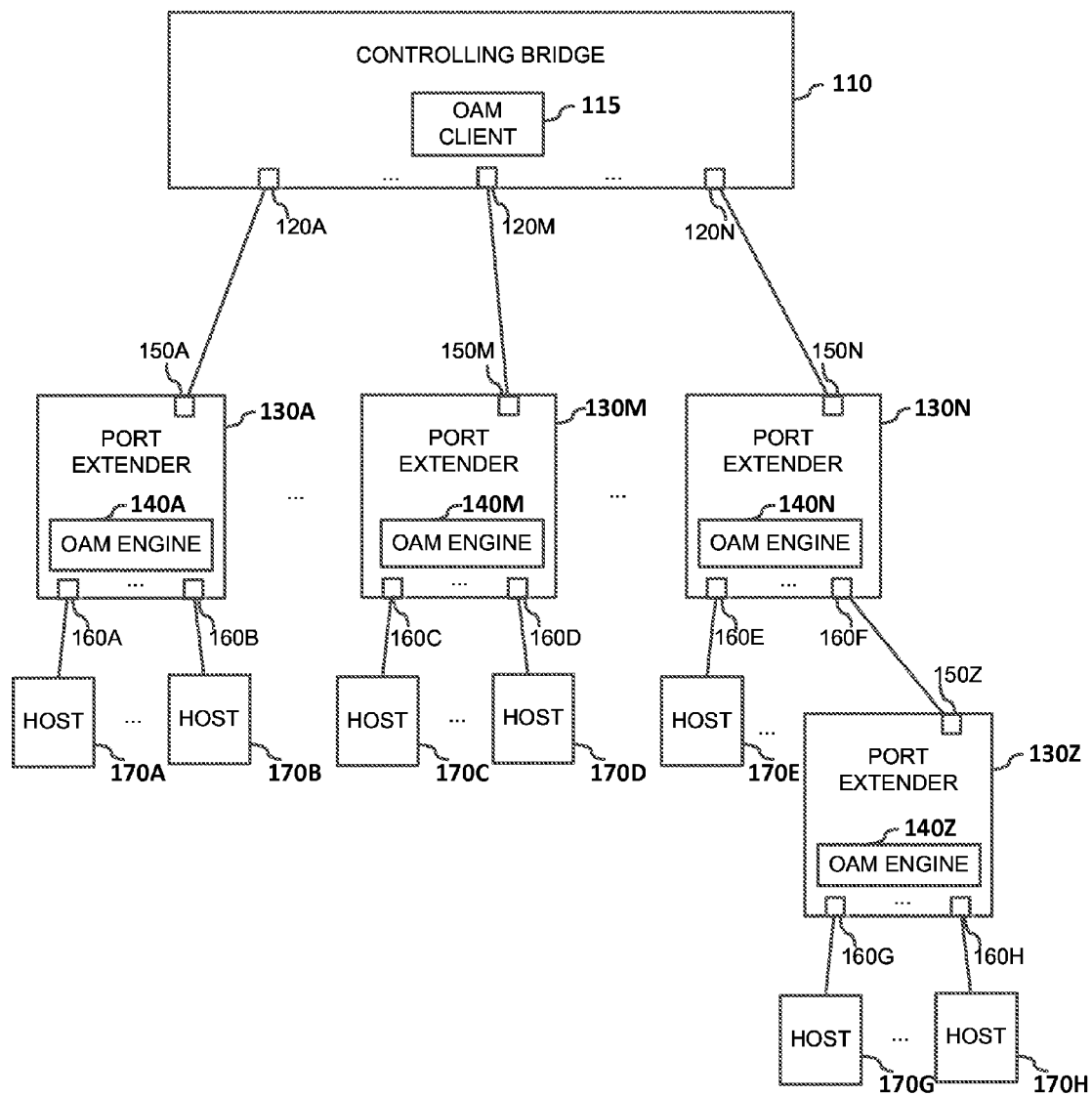
FIG. 1 depicts a portion of a network in which remote console access and debugging of port extenders may be implemented according to embodiments of the present invention.

In the following description, for purposes of explanation, specific examples and details are set forth in order to provide an understanding of the invention. It will be apparent, however, to one skilled in the art that the invention may be practiced without these details. Well-known process steps may not be described in detail in order to avoid unnecessarily obscuring the present invention. Other applications are possible, such that the following examples should not be taken as limiting. Furthermore, one skilled in the art will recognize that aspects of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components (which may or may not be shown in the figure). Also, additional or fewer connections may be used. It shall also be noted that the terms "coupled" or "communicatively coupled" shall be understood to include direct connections, indirect connections through one or more intermediary devices, and wireless connections.

In the detailed description provided herein, references are made to the accompanying figures, which form a part of the description and in which are shown, by way of illustration, specific embodiments of the present invention. Although these embodiments are described in sufficient detail to enable one skilled in the art to practice the invention, it shall be understood that these examples are not limiting, such that other embodiments may be used, and changes may be made without departing from the spirit and scope of the invention.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize, in embodiments, that more or fewer steps may be performed, that certain steps may optionally be performed, and that steps may be performed in different orders, including being done some steps being done concurrently.

The terms "datagram," "packet," or "frame" shall be understood to mean a group of bits that can be transported across a network. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell."

It shall also be noted that although embodiments described herein may be within the context of Ethernet technology, the invention elements of the current patent document are not so limited. Accordingly, the invention elements may be applied or adapted for use in other contexts.

Illustrated is a system and method for remote console access and debugging of port extenders using 802.3ah Ethernet Operation, Administration, and Management (OAM) extension. The intent of extended bridge technology, which is based on the Institute of Electrical and Electronics Engineers (IEEE) 802.1BR standard, is to deliver an extensible and scalable platform with a rich/consistent feature set and a single point of management. In systems using the extended bridge technology, single point of control and management becomes extremely important to enable operational simplicity at scale. The single point of control and management may require having the ability to provision, configure, monitor, and troubleshoot the entire system from the single central point. Controlling and managing the devices remotely becomes especially important given that vast number of port extender devices that a network may cater to and their placement (it can be geographically dispersed) in the network.

In a system using extended bridge technology based on the IEEE 802.1BR standard, one controlling bridge entity (CB) may be connected with a vast number of subordinating port extender entities (PE). Remote management of PE devices without having to be physically present at the location of the PE devices may reduce not only the capital expense but also the operational expense. To have visibility into the entire system, especially of the extended bridge ports, the controlling bridge needs to be able to collect statistics, monitor connectivity issues, port errors and faults, and other entities present in the remote port extender devices. These events need to be notified to the central control entity (i.e., CB) in a timely manner. In addition, the central control entity should also be able to take appropriate actions based on any error conditions including the ability to restart or reload the PE remotely to ensure minimal downtime and traffic loss, and collect and view console data for debugging.

In embodiments, slow protocols packets with minimal impact on bandwidth consumption may be used for network supervision and diagnosis. Slow protocols requirements are specified in IEEE802.3-2002 Annex 43B, the disclosure of which is incorporated herein in its entirety. One type of the slow protocols packets is an OAM packet. OAM packets are slow protocols frames in the Media Access Control (MAC) sub layer of the Open Systems Interconnection ("OSI") model. OAM protocol is specified in IEEE802.3ah, the disclosure of which is incorporated herein by reference in its entirety. During the packets transmission, two connected OAM sub-layers may exchange OAM protocol data units (PDUs). The OAM PDUs may be differentiated from other frames by a combination of the MAC addresses and an Ethernet type value set in the OAM PDUs. Ethernet OAM frames may share the same bandwidth as the general application traffic. This implies that the usable bandwidth of the OAM frames is kept at minimal. However, OAM frames are given the highest priority. Currently, the IEEE 802.3ah protocol is targeted for Ethernet link management only. Embodiments of the present invention extend the OAM protocol to support device management and particularly to allow remote console access and debugging of bridge port extenders in systems using the extended bridge technology.

FIG. 1 depicts a portion of a network 100 in which remote console access and debugging of port extenders may be implemented according to embodiments of the present invention. The system 100 may include a network of hosts 170A-H connected by intermediate network elements, such as routers, switches, bridges, among others. As used herein, the terms "routers," "bridges," or "switches" shall be understood to mean intermediate network elements that can process and transport data across a network. The terms "router," "bridge," and "switch" shall not be interpreted as limiting embodiments of the present invention to Layer 2 and/or Layer 3 networks. For example, the term "bridge" may include switching functionality, and vice versa.

The communication links connecting the hosts 170A-H and the network elements in the system 100 may be wired or wireless. According to an embodiment, the communication links include Ethernet links. And the example system 100 may be virtual or physical. In embodiments, the example system 100 includes a software-defined-networking (SDN) system.

The intermediate network elements in the system 100 may comprise a CB 110 and a plurality of PEs 130A-Z. The PEs 130A-N may be communicatively coupled to the CB 110 via a plurality of network interfaces provided ports 150A-N residing on the PEs 130A-N and a plurality of network interfaces provided ports 120A-N residing on the CB 110. The system 100 using the extended bridge technology may include cascaded or stacked PE configuration to further expand the reaching of the CB 110. For example, the PE 130N in FIG. 1 may be communicatively coupled to a host 170E and a PE 130Z, among others. The host 170E may be communicatively coupled to the PE 130N via a port 160E residing on the PE 130N. And the PE 130Z may be communicatively coupled to the PE 130N via a port 150Z residing on the PE 130Z and a port 160F residing on the PE 130N. In addition to the coupling to the CB 110 and other PEs, PEs 130A-Z may be communicatively coupled to a plurality of hosts 170A-H via a plurality of ports 160A-H.

To allow remote console access and debugging of PEs 130A-Z, an OAM client 115 residing on the CB 110 may transmit a protocol extension message to a PE among the plurality of PEs 130A-Z. In embodiments, the protocol extension message is an OAM protocol frame in compliance with the IEEE 802.3ah specification. Upon receiving the protocol extension message, OAM engines 140A-Z residing on the PEs 130A-Z may process the protocol extension packet. And, responsive to identifying in the protocol extension message as a request for console access, the OAM engines 140A-Z may obtain console access so that the CB 110 may use the console access to perform other management functions on the PEs 130A-Z. Other management functions may include provision, configure, monitor, troubleshoot, and/or debug, among others. An example extended bridge implementation for remote console access and debugging of PEs 130A-Z from the CB 110 is shown with additional details in FIG. 2.

Figure 2:
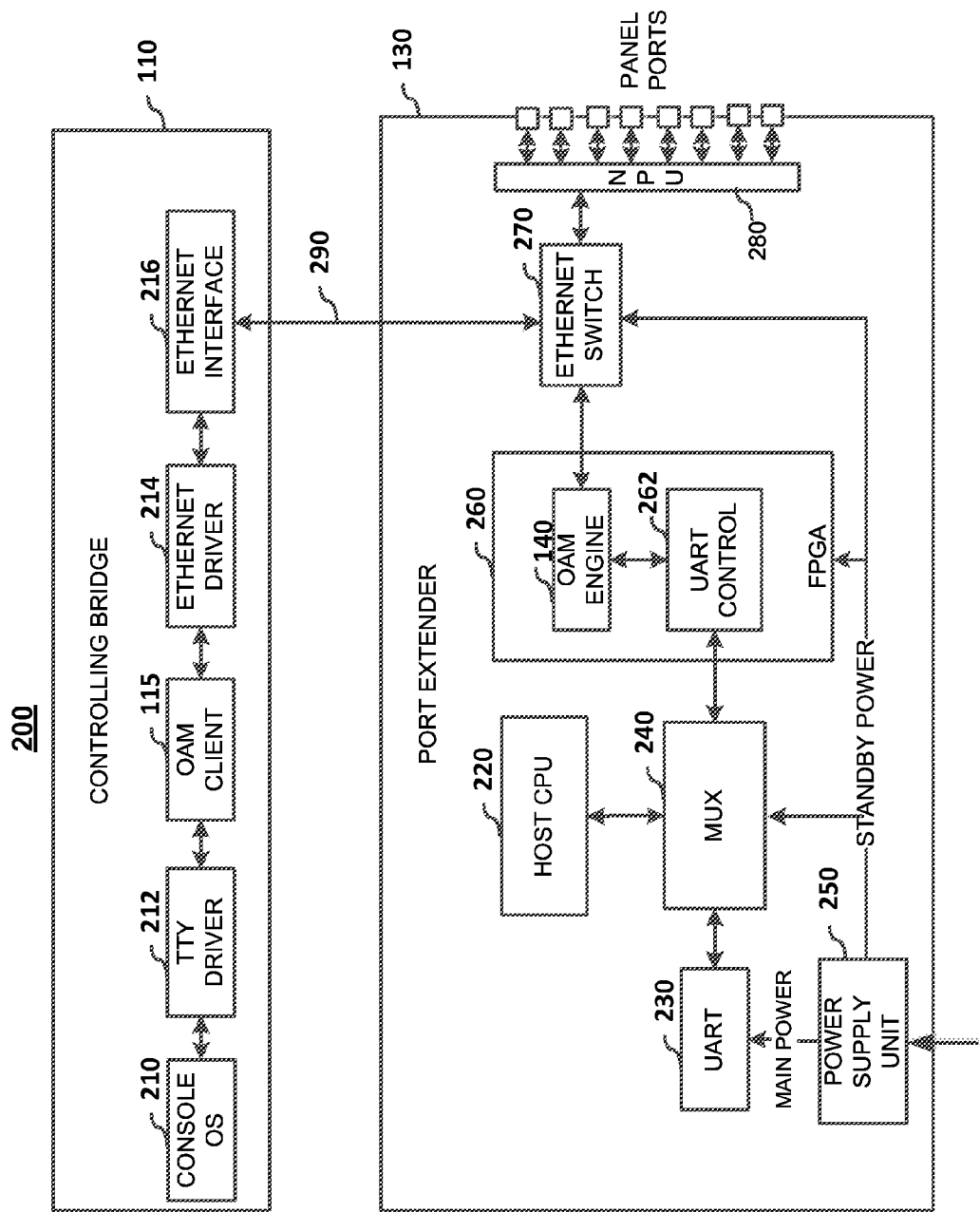
FIG. 2 depicts an exemplary system using 802.3ah Ethernet Operation, Administration, and Management (OAM) extension for remote console access and debugging of a port extender according to embodiments of the present invention.

FIG. 2 is an exemplary extended bridge system 200 for remote console access and debugging of a PE 130 from a CB 110 according to embodiments of the present invention. The CB 110 may include a console operating system (OS) 210, a Teletype (TTY) driver 212, an OAM client 115, an Ethernet driver 214, and an Ethernet interface 216. Though not shown in FIG. 2, the CB 110 may be connected to a console terminal to receive commands, such as remote console access etc., and the console terminal may display outputs from the CB 110. The console terminal may rely on the TTY driver 212 in the console OS 210 to convert commands to a hardware-specific format and send the converted commands to the OAM client 115 operatively coupled to the TTY driver 212. The console terminal may also rely on the TTY driver 212 to receive data from the OAM client 115 and display the data as output.

The commands received by the OAM client 115, such as remote console access, device control, firmware upgrade etc., may be framed as a protocol extension message and transmitted through one of the ports 120A-N to the PE 130. In embodiments, the protocol extension message is an OAM protocol frame transmitted to the PE 130 via the Ethernet driver 214 operatively coupled to the Ethernet Interface 216 hardware. The Ethernet Interface 216 hardware may provide ports, such as 120A-N, for connections to the PE 130 via the network link 290.

As shown in FIG. 2, one end of the network link 290 is connected to the Ethernet Interface 216 residing on the CB 110, and the other end of the network link 290 is connected to an Ethernet switch 270 residing on the PE 130. The protocol extension message transmitted from the CB 110 over the network link 290 may be received by the Ethernet switch 270 residing on the PE 130. The Ethernet switch 270 is communicatively coupled to a network processing unit (NPU) 280 and a protocol extension message processor 260 (shown as an FPGA in FIG. 2). One port of the Ethernet switch 270 may be brought out on a front panel. Incoming packets may be filtered by the Ethernet switch 270. Upon receiving packets, the Ethernet switch 270 may identifies the protocol extension messages, such as identifying the OAM Ethernet frames based on a combination of the MAC addresses and the Ethernet type value in the OAM Ethernet frames, and directs these messages to an OAM engine 140 residing on the protocol extension message processor 260.

The network processing unit (NPU) 280 communicatively coupled to the Ethernet switch 270 may provide network interfaces as panel ports. The NPU 280 may comprise a commercially available network processor and associated program code. In embodiments, the NPU 280 may comprise a special-purpose processor optimized to perform network communication-related tasks, such as TCP and UDP stream extraction, protocol parsing, address determination, and formation of higher level data units from the incoming data. Optionally, the NPU 110 may also be configured to perform proxy functions (including transparent proxy) and redirection and routing of packets.

In embodiments, the protocol extension message processor 260 may be implemented by one or more special purpose computing devices. The special-purpose computing devices may be hard-wired to perform the techniques, or may include digital electronic devices, such as field programmable gate arrays (FPGAs) shown on FIG. 2, that are persistently programmed to perform the techniques, or may include one or more general purpose hardware processors programmed to perform the techniques pursuant to program instructions in firmware, memory, other storage, or a combination. Such special purpose computing devices may also combine custom hard-wired logic or FPGAs with custom programming to accomplish the techniques.

The protocol extension message processor 260 may include an OAM engine 140 and a UART control 262. The OAM engine 140 may receive the protocol extension messages forwarded by the Ethernet switch 270, and may serve the purpose of processing the protocol extension messages, such as organization-specific Ethernet OAM frames. In embodiments, the OAM engine 140 may identify commands encapsulated in the protocol extension messages using the organization-specific protocol extension message structures shown in FIGS. 3-5. The OAM engine 140 may also generate the protocol extension messages, such as the organization-specific Ethernet OAM frames using the structures shown in FIGS. 3-5, and transmit the protocol extension messages to the CB 110.

After the protocol extension messages are processed by the OAM engine 140, the UART control 262 may derive one or more instructions from the protocol extension message. In embodiments, the instructions may include device control, console access, firmware upgrade, among others. Responsive to identifying in the protocol extension message the request for console access by the OAM engine 140, the UART control 262 may submit the one or more instructions to a MUX 240.

In embodiments, the MUX 240 is communicatively coupled to the protocol extension message processor 260, a host central processing unit (CPU) of the PE 130 and a UART hardware 230 of the PE 130. The UART hardware 230 may be initially under the control of the host CPU 220 of the PE 130. Though not shown in FIG. 2, the PE 130 may be connected to a console via a RJ45 port. When the host CPU 220 has control over the UART hardware 230, the console may input data to the UART hardware 230 via the host CPU 220, and may receive output data from the UART hardware 230 via the host CPU 220.

Upon receiving the one or more instructions from the protocol extension message processor 260, in embodiments, the MUX 240 may switch the control of the UART hardware 230 to the protocol extension message processor 260. After the control switch, data output from the UART hardware 230 may be directed to the protocol extension message processor 260. Such data may then be encapsulated and transmit to the CB 110, so that the CB 110 may use the data for management tasks, such as diagnosis and/or debugging remotely. During the remote management, the CB 110 may encapsulate service commands in one or more protocol extension messages and upon receiving the protocol extension messages, the protocol extension message processor 260 may utilize the control of the UART hardware 230 and submit instructions to the MUX 240 to input data to the UART hardware 230. In embodiments, such input data may include firmware upgrade data, image upgrade data, among others.

Upon completion of the remote console access and control, the protocol extension message processor 260 may forward instructions to the MUX 240, so that the host CPU 220 may regain the control of the UART hardware 230. Alternatively, via the host CPU 220, a local console may send instructions to the MUX 240 to take control of the UART hardware 230. Upon regaining control of the UART hardware 230, the host CPU 220 may again receive the data coming out of the UART hardware 230 and may again send data to the UART hardware 230.

In embodiments, to allow remote console access regardless of the state of PE 130 host CPU 220 (running, powered down, hung state, etc.), the protocol extension message processor 260 is powered by standby power. For example, as shown in FIG. 2, a power supply unit 250 may supply main power to the PE 130 components, such as the host CPU 230. In addition to the main power, the power supply unit 250 may provide a separate standby power. The separate standby power may be a power supply unit that provides 12V standby power as soon as an outside AC power source, i.e. AC power source from a wall socket, is applied and fed to the protocol extension message processor 260. In embodiments, in addition to providing the standby power to the protocol extension message processor 260, the same standby power circuit also supplies power to the Ethernet switch 270. Thus, both the protocol extension message processor 260 and the Ethernet switch 270 may remain powered when the AC power source is applied.

In FIG. 2, the OAM client 115 residing on the CB 110 and/or the OAM engine 140 residing on the PE 130 may comprise data framing function, according to embodiments. The data framing function may include processing data and encapsulating the data into frames and/or identifying the data from the frames according to a protocol. For example, the data framing function may include generating Ethernet messages, including OAM PDUs, slow protocol PDUs, and/or Ethernet MAC frames, which may be used to promote organization-specific messages and other functions in the system 200. In embodiments, the OAM client 115 and/or the OAM engine 140 may frame the protocol extension message according to the Ethernet protocol of IEEE 802.3ah as an OAM PDU packet. The OAM PDU packet may be expanded, extended and self-defined as further illustrated in FIGS. 3-5.

Figure 3:
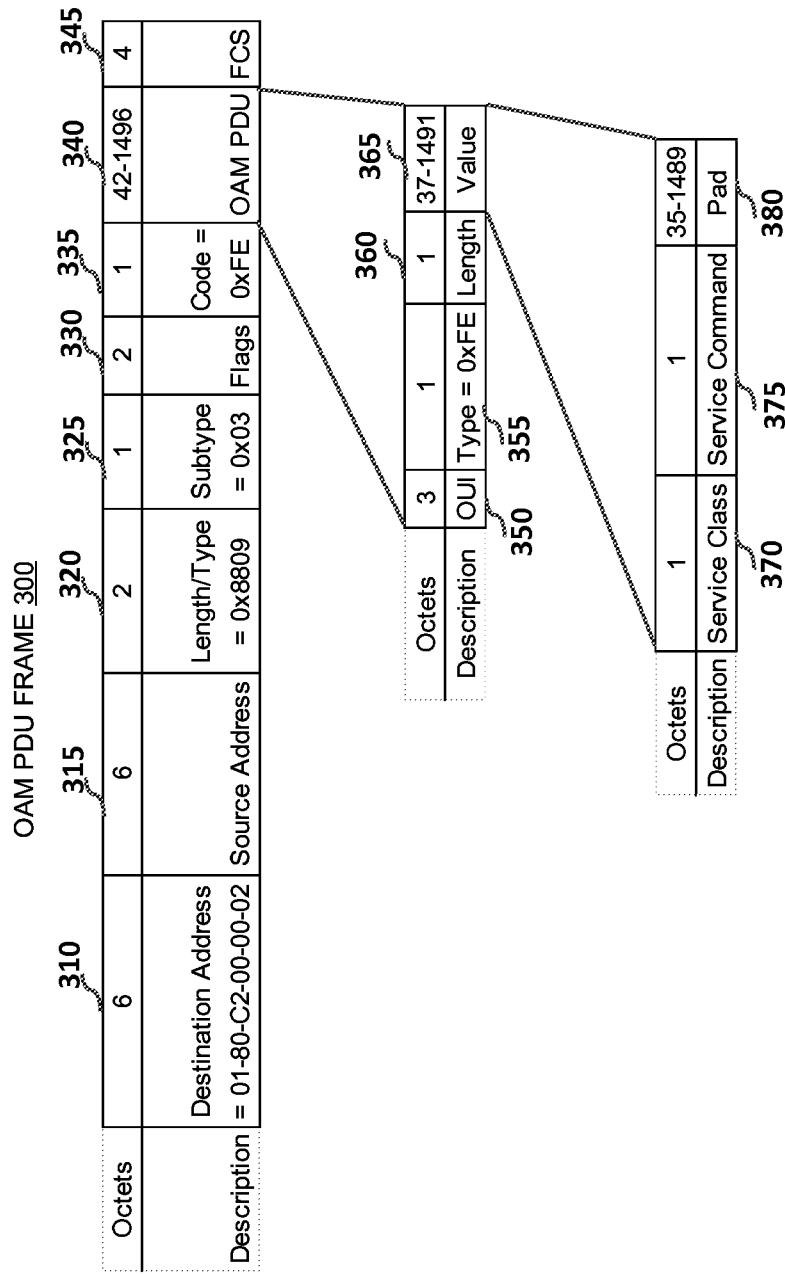
FIG. 3 depicts an exemplary OAM protocol extension frame structure according to embodiments of the present invention.

FIG. 3 illustrates an embodiment of an exemplary protocol extension message structure 300, which may be generated and/or received by, for example, the OAM client 114 residing on the CB 110 and/or the OAM engine 140 residing on the PE 130. In embodiments, the protocol extension message 300 may be an OAM PDU based on the 802.3ah standard. The protocol extension message 300 according to the 802.3ah standard may be extended by, for example, setting a type of OAM PDU to a code 0xFE, to promote organization-specific function.

As shown in FIG. 3, the protocol extension message 300 may comprise a destination address (DA) 310, a source address (SA) 315, a length/type 320, an subtype 325, a flags field 330, a code 335, an OAM data/pad 340, and a frame check sequence (FCS) 345. The DA 310 may be a network address, such as a MAC address, for a destination node that is intended to receive data. In embodiments, the DA 310 may use a slow protocol multicast destination address of 01-80-C2-00-00-02 to indicate the frame is a slow protocol packet. The SA 315 may be a network address for a source node that may originate the external protocol extension message 300. In embodiments, the SA 315 may include the MAC address associated with the port through which the protocol extension message is transmitted. The length/type 320 may indicate that the message's length and/or the type of a slow protocol message. For instance, the length/type 320 may be set to 0x8809 according to IEEE 802.3ah to indicate the frame being a slow protocol type. The subtype 325 may provide additional information regarding the protocol extension message 300 type, such as indicating that the protocol extension message 300 is an OAM PDU. For instance, the subtype 325 may be assigned a value equal to 0x03 to signify the slow protocol being encapsulated. The flags field 330 may include various flags to indicate information such as status, among others. The code 335 may indicate a type or format associated with the protocol extension message 300. For example, the code 335 may be set to the value 0xFE to indicate that the protocol extension message 300 is an organization-specific message (e.g., extension OAM PDU), which may comprise information formatted according to an organization-specific format. And the FCS 345 may be used for error detection and correction, such as a Cyclic Redundancy Check (CRC) or other checksum.

The protocol extension messages 300, according to embodiments of the present invention, may allow organizations to encapsulate their own message formats and add organization-specific management information or functions to the network in the OAM data/pad 340. For example, the protocol extension messages 300 may include a plurality of message formats, such as type-length-value (TLV) formats, in order to allow the encapsulation of a plurality of organization-specific messages in a single Ethernet message. In embodiments, the encapsulated organization-specific messages may be fixed length or extended to variable length.

As shown in FIG. 3, the OAM data/pad 340 may be further divided to include an Organizationally Unique Identifier (OUI) 350 followed by a TLV triplet. The TLV triplet may comprise a type field 355, a length field 360, and a value field 365. The OUI 350 may be set to a value to indicate that the message is formatted as specified by a specific organization, such as an enterprise. For instance, when a message is formatted as specified by Dell Inc., the OUI 350 field may be set to 0x00-06-5B. The type field 355 may indicate a control message for a function. For example, the type field 355 may be set to the value 0xFE to indicate that the message is an organization-specific message (e.g., a protocol extension OAM PDU), which may comprise information formatted according to an organization-specific format.

In embodiments, the length field 365 may be further divided to a service class field 370 and a service command field 375, followed by pad 380. The service class field 370 may define the type of management service to be controlled, such as component/device control, console access/redirect, firmware upgrade, and/or image upgrade, among others. For a given service class 370, the service command field 375 may indicate a set of one or more operations to be performed for the service class 370, such as initiate console access etc. for console access/redirect The service class field 370 and the service command field 375 are further illustrated in FIG. 4 and FIG. 5 respectively with additional details.

In embodiments, the length of each of the DA 310 and SA 315 may be equal to about six octets, the length of each of the length/type 320 and the flags field 330 may be equal to about two octets, the length of each of the subtype 325, the code 335, the type 355, and the length 360 may be equal to about one octet, the length of the OUI field 350 may be equal to about three octets, and the length of the FCS 345 may be equal to about four octets.

FIG. 4 is a service class table 400 illustrating an exemplary structure of the service class field 370. The service class table 400 includes some examples to depict how the eight bits of the service class field 370 may define the type of management service to be controlled. Some bits of the service class field 370 may be reserved for future use. For example, as shown in FIG. 4 according to embodiments, bits 5-7 of the service class field 370 may be reserved and set to zero when sending an OAM PDU and may be ignored on reception for compatibility with future use of reserved bits. Bit 4 of the service class field 370 may be used as an acknowledge bit and set when the OAM PDU represents an acknowledge frame from PE 130 back to CB 110 for the requested service class. Bits 0-3 may be designated to define the type of management service to be controlled. For example, according to embodiments of the present invention, "0000" and "0100-1111" may be reserved; "0001" may indicate the type of management service is device control of a PE; and "0010" may indicate console access/redirect. For each service class, one or more service commands may be defined. For example, when the service class value "0010" indicates the type of management service to be controlled being console access/redirect, one or more service commands may be defined as illustrated further in FIG. 5.

FIG. 5 is a service command table 500 for the service class "console access/redirect", illustrating an exemplary structure of the service class field 375. The service command table 400 includes some examples to depict how the eight bits of the service command field 375 may define a set of operations to be performed for a given service class. Some bits of the service command field 375 may be reserved for future use. For example, as shown in FIG. 5 according to embodiments, bits 4-7 of the service command field 375 may be reserved and set to zero when sending an OAM PDU and may be ignored on reception for compatibility with future use of reserved bits. Bits 0-3 of the service command field 375 may be used to define a set of operations to be performed for a given service class. In case the service class is "console access/redirect", a set of service command including "0001" may represent initial console access.

Figure 6:
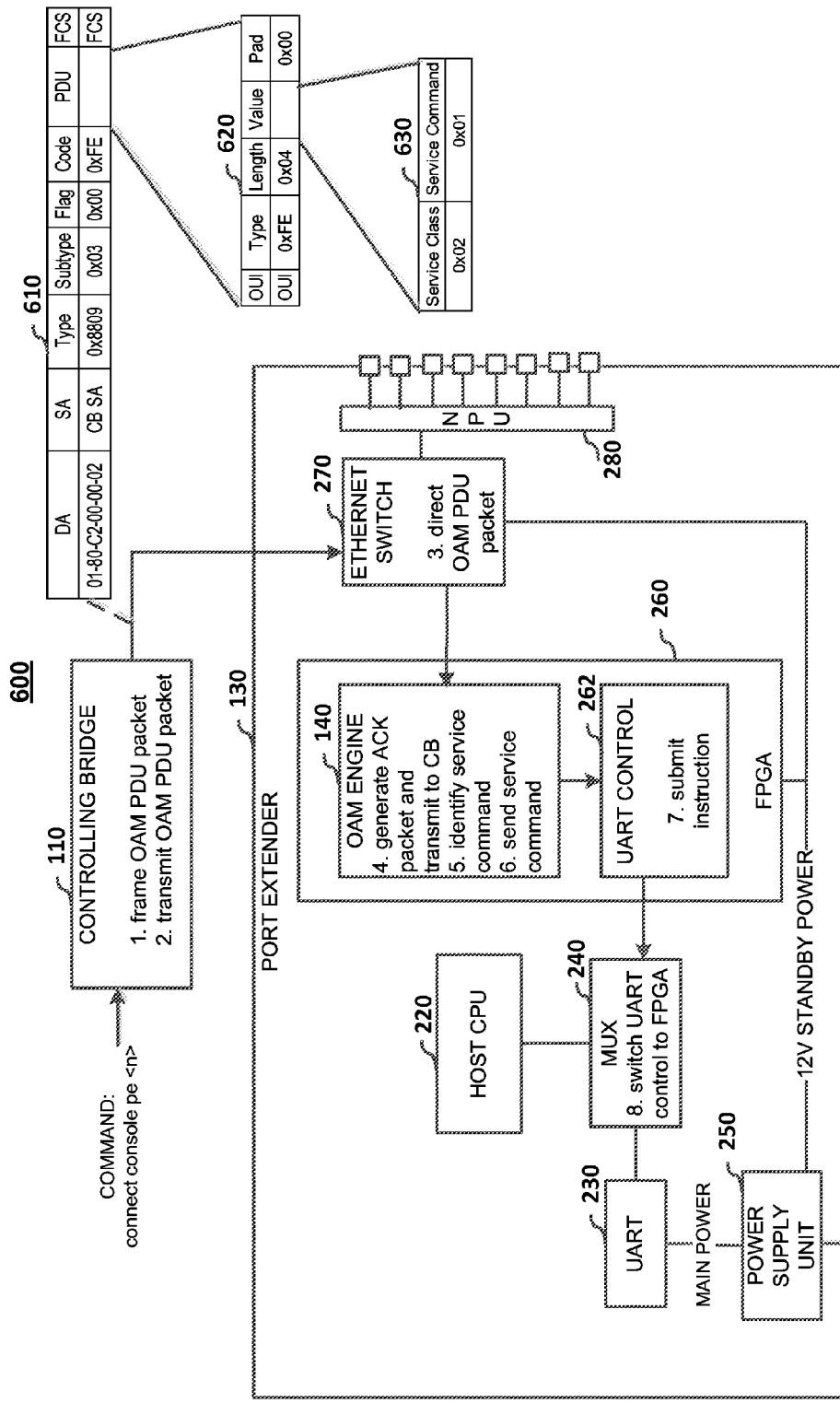
FIG. 6 depicts an exemplary system using 802.3ah Ethernet OAM extension to establish remote console access of a port extender according to embodiments of the present invention.

FIG. 6 is a system diagram illustrating an exemplary system 600 using the extended bridge technology and 802.3ah OAM protocol extension to establish remote console access, according to embodiments. In order to establish remote console access, the exemplary system 600 may receive a console access request. In embodiments, the console access request may come from a command entered into a terminal console communicatively coupled to a controlling bridge 110. For example, as shown in FIG. 6, to establish a console access to a PE 130 with an identifier of "n", a console command may be entered as "connect console pe <n>" and the console command may be received by the CB 110 as a console access request to the PE 130. Upon receiving the console access request, the CB 110 may frame a protocol extension message 610 in step 1. In embodiments, the protocol extension message 610 may be an OAM PDU according to the IEEE 802.3ah standard. In embodiments, the protocol extension message 610 may be framed according to the structure as illustrated in FIGS. 3-5.

For example, as shown in FIG. 6, the destination address (DA) field may be set to 01-80-C2-00-00-02 to indicate that the frame is a slow protocol packet. The source address (SA) field may be set to a MAC address associate with a CB 110 port, through which the protocol extension message 610 is transmitted. The length/type field may be set to 0x8809 to indicate the frame being a slow protocol type. The subtype field may be set to 0x03 to signify the slow protocol being encapsulated. The flags field may include value 0x00 as the current status. The code field may be set to 0xFE to indicate that the protocol extension message 610 is an organization-specific message (e.g., extension OAM PDU), which may comprise information 620 formatted according to an organization-specific format. As part of the organization-specific information 620, the organization code is set in the OUI field followed by a TLV triplet. The TLV triplet may include a type field being set to 0xFE to indicate that the protocol extension message 610 is an organization-specific message, and the length field being set to 0x04 representing the length of the TLV, and the value being set to information 630 related to service class and service command.

Since the command received by the CB 110 is to establish console access, in embodiments, using the service class table 400 as illustrated in FIG. 4, the service class field may be set to 0x02 to represent console access/redirect. For the given service class console access/redirect, in embodiments, using the service command table 500 as shown in FIG. 5, the service command may be set to 0x01 to represent a request for initial console access for the console access/redirect service class. Having set values in various fields, the OAM PDU may be padded to meet the Ethernet minimum packet size requirement.

Having framed the protocol extension message 610, the CB 110 may transmit the protocol extension message 610 to the PE 130 in step 2 via a port associated the source MAC address specified in the protocol extension message 610. On the receiving end, an Ethernet switch 270 residing on the PE 130 may receive the protocol extension message 610. Upon receiving the message 610, the Ethernet switch 270 may filter incoming packets and identify the protocol extension message 610 based on a combination of the MAC addresses and the Ethernet type value. Responsive to receiving the protocol extension message 610, the Ethernet switch 270 may direct the protocol extension message 610 to a protocol extension message processor 260 in step 3. In embodiments, the protocol extension message processor 260 is a FPGA, as shown in FIG. 6, although other implementations may be used.

The protocol extension message 610 forwarded by the Ethernet switch 270 may be received by an OAM engine 140 residing on the protocol extension message processor 260. Upon receiving the protocol extension message 610, the OAM engine 140 may generate an acknowledgement message and transmit the acknowledgement message to the CB 110 in step 4. In embodiments, the acknowledgement message may have a structure as illustrated in FIGS. 3-5, with the acknowledgement bit (bit 4 of the service class field) set. In embodiments, the OAM engine 140 may process the protocol extension message 610 in step 5. In embodiments, the OAM engine 140 may identify commands in the protocol extension message 610 using the organization-specific protocol extension message structures shown in FIGS. 3-5. The identified service command such as initial console access may then be sent to a UART control unit 262 in step 6.

After the protocol extension messages are processed by the OAM engine 140, the UART control 262 may derive one or more MUX instructions based on the service command in step 7. Upon receiving the one or more MUX instructions from the UART control 262, the MUX 240 may switch the control of the UART hardware 230 to the protocol extension message processor 260, so that the CB 110 may obtain remote console access in step 8.

It shall be noted that aspects of the present invention provide low-cost and highly responsive systems and methods for in-band console access and debugging of geographically dispersed network elements from a central location. Relative to conventional use of terminal servers for network elements management, embodiments of the present invention reduce both capital expense and the operational expense.

The capital expense reduction comes from the replacement of the terminal servers with an in-band console access and debugging mechanism using the IEEE 802.3ah OAM protocol extension in a system using the extended bridge technology according to the IEEE 802.1BR standard. The intent of the extended bridging technology based on the IEEE 802.1BR standard is to deliver an extensible and scalable platform with a rich/consistent feature set and a single point of management. A system using the extended bridge technology is capable of providing remote connectivity with a central point of control. Utilizing the extensible and scale platform for network elements management, according to embodiments of the present invention, the capital expense associated with the purchasing of the terminal servers may be eliminated.

In addition to the capital expense reduction, operational capital expense associated with using the terminal servers may also be reduced. For example, traditional terminal servers may require console access ports for connection, such as RJ-45 and/or USB-B on the port extenders. Not relying on the terminal servers for console access may free up the space occupied by the terminal server console access ports. The extra space on the front panel may be used for other purposes, such as adding more data ports on the front panel to increase the network bandwidth. By eliminating the use of the terminal servers for port extender remote connectivity, both the capital expense and the operational expense from using the terminal servers, including connection, maintenance, support, and/or licensing may be reduced. Thus, relative to the conventional system of using the terminal servers for network elements management, embodiments of the present invention is more cost effective.

The low-cost system and method according to embodiments of the present invention is also highly responsive. One aspect of the highly responsiveness is that as part of the in-band console access and debugging mechanism, embodiments of the present invention implement in-band remote console access operation independent of the port extender's state (running/hanging/booting/powered down, etc.). Conventional in-band management usually works after the remote computing device has been booted. It may not be useful to fix problems that prevent the remote computing device from booting. In contrast, the protocol extension message processor and the Ethernet switch on the port extender may be powered by standby power according to embodiments of the present invention. The standby power may allow the port extender to communicate with the controlling bridge even if other components of the port extender, including the host CPU of the port extender, are not operating. Thus, embodiments of the present invention may provide highly responsive in-band console access and debugging whenever necessary and regardless of the port extender's state.

The highly responsive system may provide in-band console access and debugging mechanism of geographically dispersed network elements from a central location. In a system using the extended bridge technology, the controlling bridge has connectivity to a vast number of port extenders. OAM protocol extension messages are slow protocols messages with minimal impact on bandwidth consumption. Transmitting the OAM protocol extension messages over the connections between the controlling bridge the subordinate port extenders keeps usable bandwidth at minimal. The minimal bandwidth consuming OAM protocols extension messages may be defined by an organization for its own service classes and service commands, as illustrated in FIGS. 3-5. Using the minimal bandwidth consuming OAM protocol extension messages, the controlling bridge may be notified of the port extender conditions in a timely manner, even when the port extender host CPU is not running, powered down, and/or in a hung state etc. And based on the condition, the controlling bridge may take appropriate actions promptly, such as restart or reload the PE remotely to ensure minimal downtime and traffic loss, among others. Thus, embodiments of the present invention combine the extended bridge technology with the OAM protocol extension to provide a highly responsive in-band console access and debugging mechanism for geographically dispersed port extender management.

It shall be noted that aspects of the present patent document may be directed to information handling systems. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, router, switch, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 7:
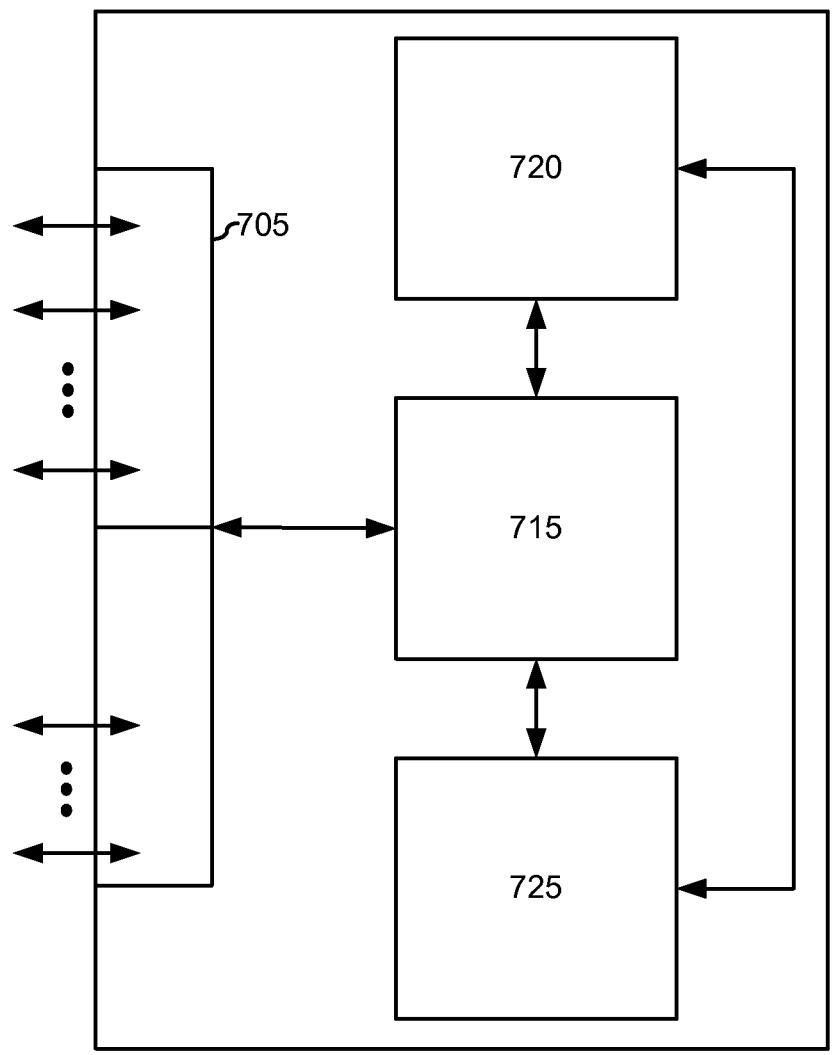
FIG. 7 depicts a block diagram of an exemplary information handling system node according to embodiments of the present invention.

FIG. 7 depicts a block diagram of an exemplary information handling system node according to embodiments of the present invention. It will be understood that the functionalities shown for a network element 700 may operate to support various embodiments of the present invention— although it shall be understood that a network element may be differently configured and include different components. The network element 700 may include a plurality of I/O ports 705, a data processing and fabric component 715, tables 720, and a control functionality portion 725. In embodiments, the I/O ports 705 are connected to one or more nodes. The data processing functionality 715 may use information included in the network data received at the network element 700, as well as information stored in the tables 720, to identify another network element for the network data, among other possible activities. In embodiments, the fabric component 715 then schedules the network data for propagation through the network element to an egress port for transmission to the next network element.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

What is claimed is:

1. An information handing apparatus comprising:
    a networking processing unit configured to process data received on one or more ports;
    a switching device, communicatively coupled to the network processing unit, that is configured to receive a protocol extension message from an upstream network device and responsive to receiving a protocol extension message, directs the protocol extension message to a protocol extension message processor;
    the protocol extension message processor, communicatively coupled to the switching device, that processes the protocol extension message forwarded by the switching device and responsive to identifying in the protocol extension message as a request for console access, submits one or more instructions to a multiplexer (MUX) to switch control of a universal asynchronous receiver/transmitter (UART) from a host central processing unit (CPU) of the information handing apparatus to the protocol extension message processor; and
    the multiplexer (MUX), communicatively coupled to the protocol extension message processor, that receives the one or more instructions from the protocol extension message processor and switches control of the UART to the protocol extension message processor.

2. The apparatus of claim 1, further comprising:
    a second power supply coupled to the protocol extension message processor and the switching device, wherein the second power supply is separate from a first power supply coupled to the UART.

3. The apparatus of claim 1, wherein the protocol extension message processor includes:
    an Operations, Administration and Management (OAM) engine module, that processes the protocol extension message forwarded by the switching device to identify in the protocol extension message the request for console access; and
    a UART control module that derives the one or more instructions from the protocol extension message, and submits the one or more instructions to the MUX.

4. The apparatus of claim 1, wherein the protocol extension message is an Operations, Administration and Management (OAM) protocol frame comprising a header that indicates a protocol extension and at least one type-length-value (TLV) comprising a type field, a length field, and a value field.

5. The apparatus of claim 1, wherein the protocol extension message processor comprises an integration of a plurality of integrated circuits.

6. The apparatus of claim 3, wherein the OAM engine module generates an acknowledgement message, and transmits the acknowledgement message to the upstream network device via the switching device.

7. The apparatus of claim 3, wherein the MUX that receives UART data from the UART after the UART is placed under the processor control, forwards the UART data to the OAM engine module via the UART control module, wherein the UART data is encapsulated in the protocol extension message and transmitted by the protocol extension message processor to the upstream network devices via the switching device.

8. The apparatus of claim 4, wherein the header comprises information indicating the protocol extension message is a slow protocol type and each of the TLV includes a service class field and a service command field.

9. The apparatus of claim 8, wherein the service class field defines one or more types of management service performed, and for each of the service class field, the service command field indicates a set of one or more operations to be performed.

10. The apparatus of claim 8, wherein the switch device identifies the protocol extension message by identifying the slow protocol type and a Media Access Control (MAC) address associated with an interface on the upstream network device.

11. The apparatus of claim 5, wherein the integration of the plurality of integrated circuits comprises a field programmable gate array (FPGA).

12. An apparatus comprising:
a plurality of interfaces configured to communicate with one or more nodes; and
an Operations, Administration and Management (OAM) client module configured to frame a protocol extension message to transmit through at least one of the plurality of interfaces to the one or more nodes, the protocol extension message comprising a request to the one or more nodes for console access by switching control from a host processor of the one or more nodes to a protocol extension message processor.

13. The apparatus of claim 12 further comprising:
a console operating system;
a terminal driver (TTY) module, running on the console operating system, that performs input/output operations for the OAM client module and receives the console access request; and
a driver, running on the console operating system, that transmits and receives the message through one or more of the plurality of interfaces.

14. The apparatus of claim 12, wherein through the one or more of the plurality of interfaces, the OAM client module is configured to receive a second OAM protocol frame from the one or more nodes acknowledging the console access.

15. The apparatus of claim 12, further comprising:
through the one or more of the plurality of interfaces, the OAM client module is configured to receive a third OAM protocol frame comprising data from the one or more nodes.

16. The apparatus of claim 14, wherein the second OAM protocol frame is an Operations, Administration and Management (OAM) protocol frame comprising a header that indicates a protocol extension and at least one type-length-value (TLV) comprising a type field, a length field, and a value field comprising a bit being set to indicate the second OAM protocol frame is an acknowledgement.

17. A method for remote access to a port extender from a controlling bridge, the method comprising:
responsive to receiving at the port extender a request from the controlling bridge for console access to the port extender, submitting one or more instructions to a multiplexer (MUX) to switch control of a universal asynchronous receiver/transmitter (UART) from a host central processing unit (CPU) of the port extender to a processor residing on the port extender; and
switching control by the MUX of the UART to the processor according to the one or more instructions.

18. The method of claim 17, further comprising:
transmitting by the processor an acknowledgement to the controlling bridge acknowledging the console access.

19. The method of claim 18, further comprising:
receiving data from the UART; and
transmitting by the processor the data to the controlling bridge.

20. The method of claim 19, further comprising:
responsive to receiving an instruction from the controlling bridge to end console access to the port extender, submitting the instruction to the MUX to switch control of the UART from the processor to the host CPU; and
switching control by the MUX of the UART to the host CPU according to the instruction.

* * * * *